March 6, 1956  W. A. WULLE  2,737,031
HEAT ENERGY-CONVERTING SYSTEM AND PROCESS
Filed Feb. 12, 1952  3 Sheets-Sheet 1
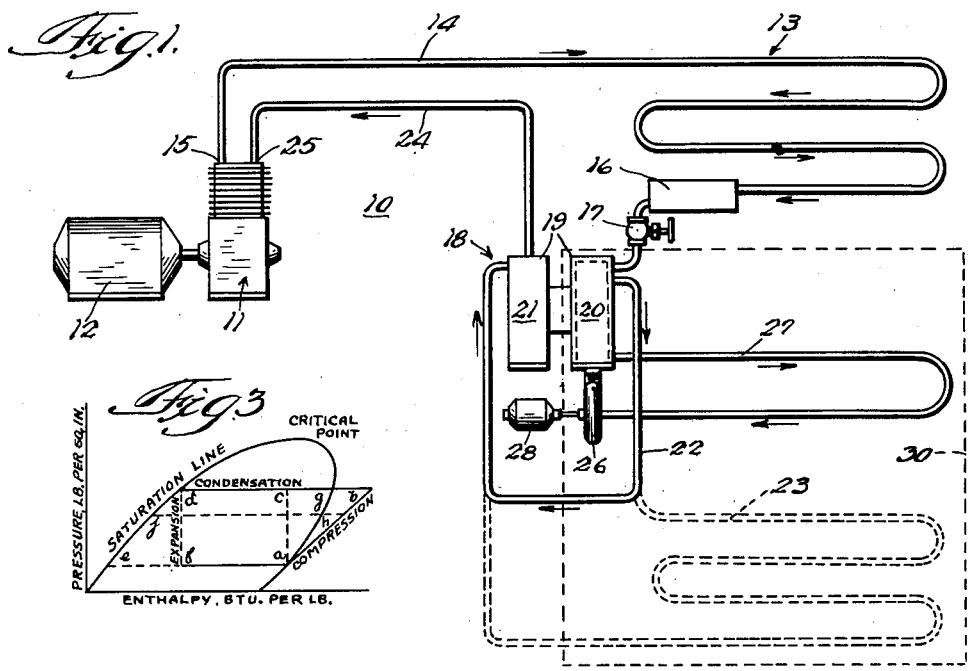
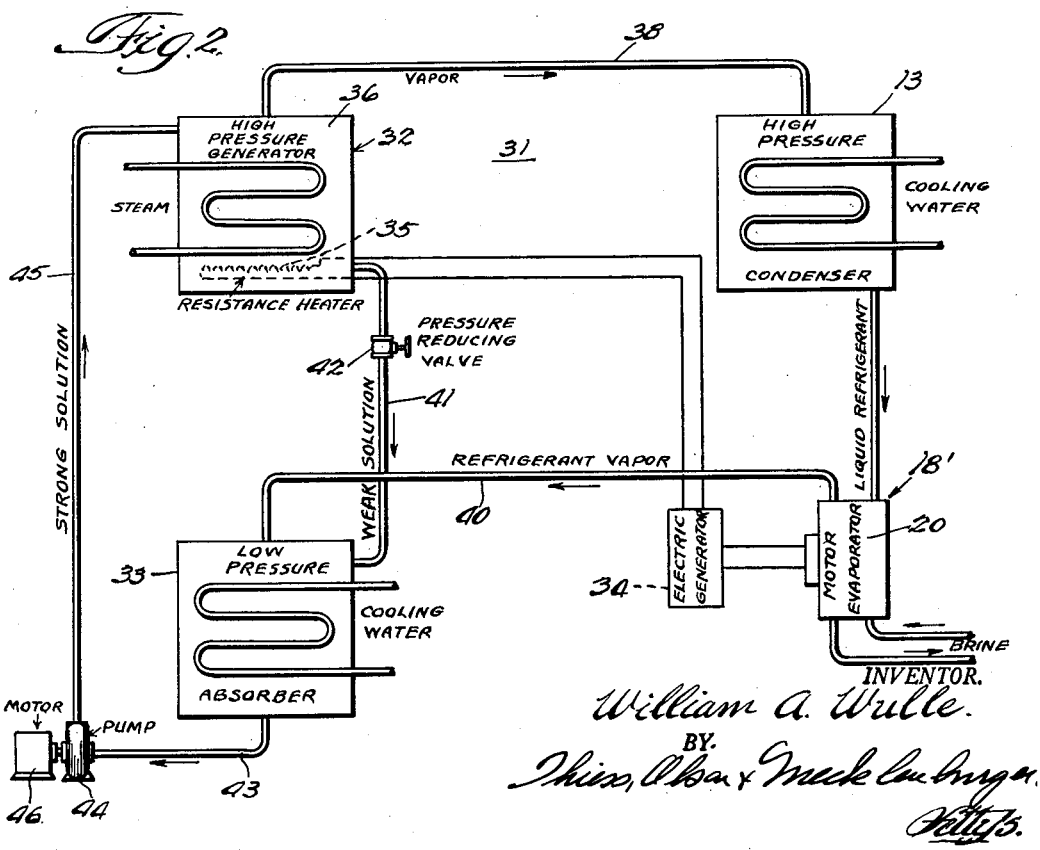
INVENTOR.
William A. Wulle.

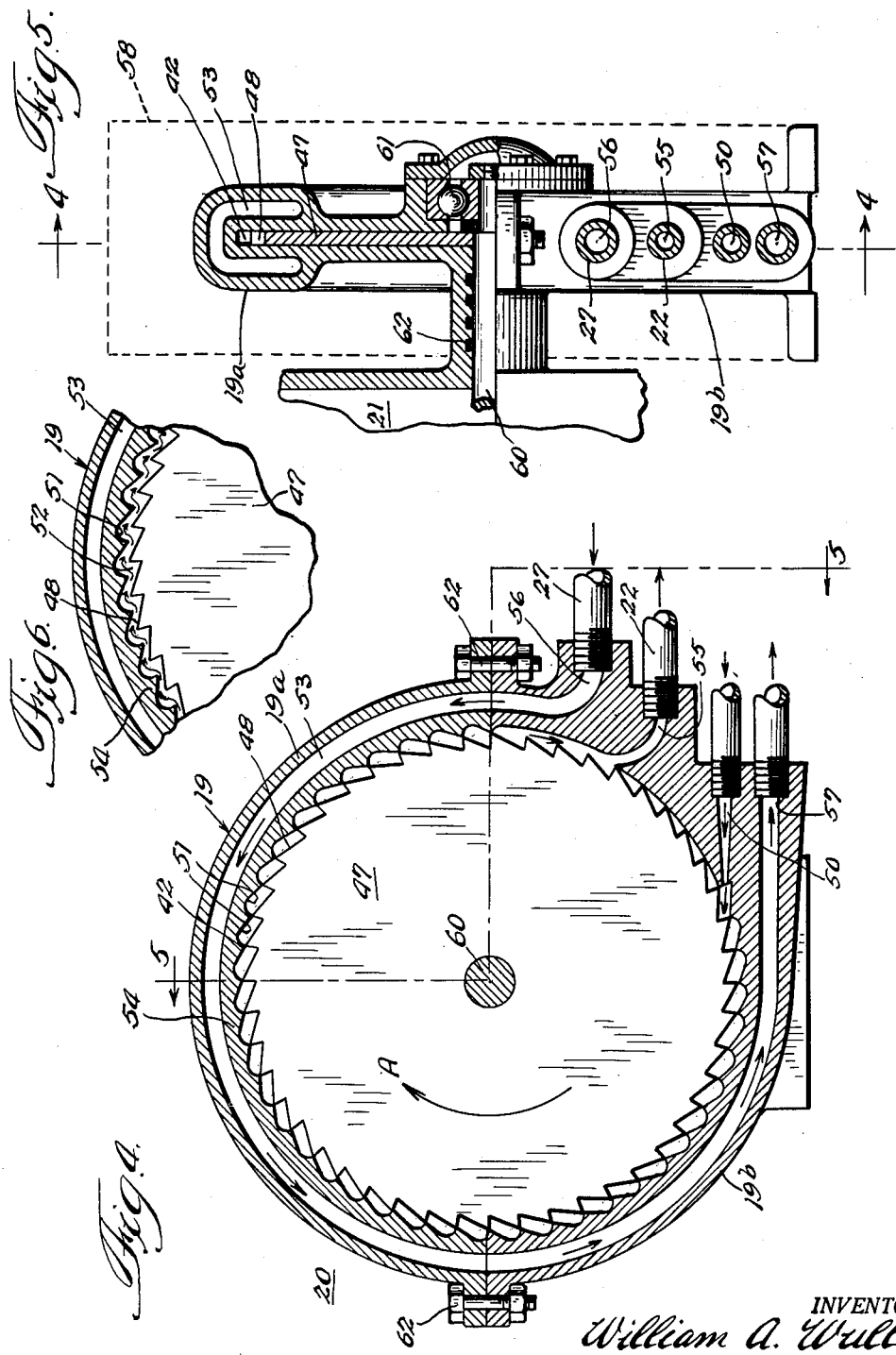

March 6, 1956 W. A. WULLE 2,737,031
HEAT ENERGY-CONVERTING SYSTEM AND PROCESS
Filed Feb. 12, 1952 3 Sheets-Sheet 3

INVENTOR.
William A. Wulle
BY
Thiess, Olson & Mecklenburger.
Attys.

United States Patent Office 2,737,031
Patented Mar. 6, 1956

2,737,031

HEAT ENERGY-CONVERTING SYSTEM AND PROCESS

William A. Wulle, Chicago, Ill.

Application February 12, 1952, Serial No. 271,227

5 Claims. (Cl. 62—117.6)

This invention relates to a heat energy-converting system, such as a refrigerating or a heat pump system, and more particularly to an apparatus used in such a system.

Various systems of this type have heretofore been proposed which fail effectively to utilize, by converting into useful work, the energy, in the form of heat, absorbed by the refrigerant during its expansion, and thus fail to obtain the most efficient operation of such systems.

Thus it is one of the objects of this invention to provide a system which utilizes and converts into useful work the energy, in the form of heat, absorbed by the refrigerant during expansion so as materially to reduce the amount of energy required to maintained operation of the system.

It is a further object of this invention to provide an apparatus which may be readily installed in existing systems whereby to increase the operating efficiency of such systems.

It is a further object of this invention to provide an apparatus for use in such systems which is simple, compact, and durable in construction.

Further and additional objects will appear from the description, accompanying drawings, and appended claims.

In accordance with one embodiment of this invention a system is provided comprising the combination of a heat transfer medium, a volatile refrigerant, a first means for imparting pressure to said refrigerant, second means in contact with said heat transfer medium for effecting expansion of said refrigerant and effecting simultaneously with said expansion the absorption of heat from said heat transfer medium, and third means operatively connected to said second means and utilizing the kinetic energy expanded by said refrigerant during expansion thereof and the heat energy simultaneously absorbed by the refrigerant during expansion to impart partial pressure to said refrigerant subsequent to its expansion.

For a more complete understanding of this invention reference should now be made to the drawings wherein:

Fig. 1 is a diagrammatic view of one form of the proposed system;

Fig. 2 is a diagrammatic view of a second form of the proposed system;

Fig. 3 is a conventional pressure-enthalpy diagram for the proposed system under optimum performance;

Fig. 4 is an enlarged vertical sectional view of one form of the heat energy-converting apparatus which may be included within the systems shown in Figs. 1 and 2;

Fig. 5 is an enlarged fragmentary right end view of the apparatus shown in Fig. 4 and having a portion thereof in section taken along line 5—5 of Fig. 4;

Fig. 6 is an enlarged fragmentary sectional view of a portion of the apparatus shown in Figs. 4 and 5;

Figure 8:
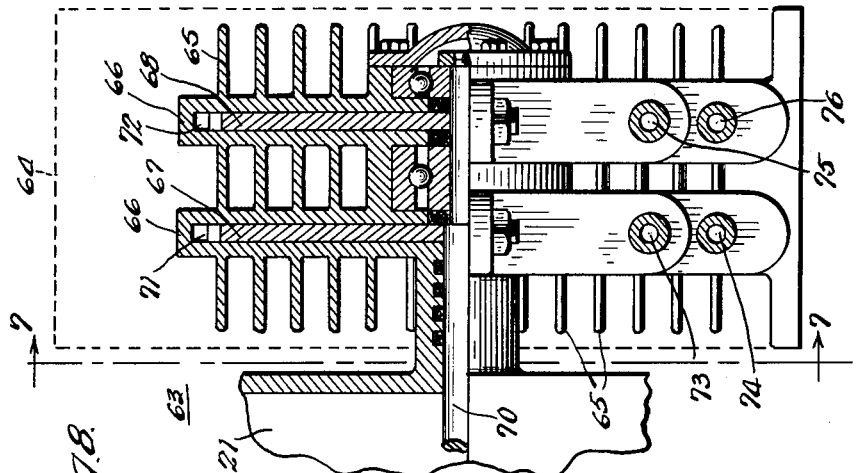
Fig. 8 is an enlarged right end view of the modified form of apparatus shown in Fig. 7 and having a portion thereof in section taken along line 8—8 of Fig. 7.

Referring now to the drawings and more particularly to Fig. 1, one form of an improved refrigerating system 10 is shown wherein the heat absorbed by the refrigerant during expansion thereof is converted into work energy thereby minimizing the amount of external energy required to maintain operation of the system. The system in this instance uses a volatile refrigerant, such as Freon, and a heat transfer medium, such as brine. The system 10 comprises a primary compressor 11 which is actuated by some external source of power such as a motor or engine 12, a conventional condenser 13 which is connected by a suitable conduit 14 to the output or high pressure side 15 of the compressor, a refrigerant-receiving chamber 16 wherein the compressed refrigerant, in a liquid state, is accumulated and discharged therefrom through a manually adjusted flow valve 17, and a heat energy-converting apparatus 18 which is provided with a turbine section 20 and a pre-compressor section 21. The sections 20 and 21 are hermetically sealed within a housing 19 common to both sections. An outlet from turbine section 20 for the refrigerant, subsequent to the latter being reconverted or substantially reconverted by expansion into a gaseous state, is normally connected by means of a conduit 22 directly to the input side of the pre-compressor section 21. Where, however, upon leaving the turbine section 20 the refrigerant has not completely expanded or vaporized, it may be desirable to cause the refrigerant to flow through an auxiliary evaporator 23, shown in dotted lines in Fig. 1, so as to effect complete vaporization of the refrigerant prior to the refrigerant being introduced into the input side of pre-compressor section 21. The output side of pre-compressor section 21 is connected by a suitable conduit 24 to the low pressure or intake side 25 of the primary compressor 11. The function of the various elements of the system 10 heretofore mentioned, will be described more fully hereinafter. The energy for driving the pre-compressor section 21 of apparatus 18 is derived from the kinetic energy expended by the refrigerant upon expansion thereof within the turbine section 20, and also by the heat absorbed by the refrigerant, simultaneously with its expansion, from the brine which is circulated within the turbine section. A pump 26, which is actuated by a suitable prime mover 28, provides the means for producing the aforementioned circulation of the brine within the turbine section. A conduit 27, communicates with pump 26 and the turbine section 20, and directs the flow of the brine, subsequent to heat being extracted therefrom in section 20, into a cooling compartment or cabinet 30 where the brine once again picks up heat.

The operation of system 10 may be more clearly understood by referring to Fig. 1 in conjunction with the conventional pressure-enthalpy diagram shown in Fig. 3. The volatile refrigerant, while in a gaseous state, is compressed initially to a predetermined pressure, indicated by the line b—d in Fig. 3, by the primary compressor 11. Subsequent to being compressed by the primary compressor 11, the refrigerant is converted to its liquid state within the condenser 13 and is then accumulated in the receiver chamber 16. Depending on the setting of flow valve 17, which setting is determined by the amount of heat to be extracted from the cooling compartment 30, the compressed volatile refrigerant, in its liquid state, is introduced into the turbine section 20 of the apparatus 18. Upon the liquid refrigerant being initially introduced into turbine section 20, there is a change in the enthalpy of the liquid refrigerant along the "saturation line" from d to e, as seen in Fig. 3. During this change the latent heat of the liquid refrigerant is extracted in an amount equal to enthalpy $f$ minus $e$. It is the equivalent amount of this heat energy ($f$ minus $e$) that is converted into useful work by the turbine section 20. But the work so obtained is not from the latent heat of the liquid refrigerant alone because there is concomitant expansion of the refrigerant. Actually there is an exchange of the heat absorbed during expansion for the latent heat of the liquid refrigerant extracted in the process. Simultaneously with this pressure drop, the enthalpy of the vaporized refrigerant increases from $e$ to $a$ as a result of the heat which is absorbed from the circulating brine. Upon leaving the turbine section 20, the vaporized refrigerant enters the intake side of the pre-compressor section 21. The kinetic energy of the refrigerant and the heat energy picked up by the refrigerant during expansion is transformed into driving power for the pre-compression section 21 which effects pre-compression of the expanded refrigerant to some pressure-enthalpy values such as $h$, which point is located within the area bounded by $a$, $b$, and $g$. Thus the combination of the turbine section 20 and the pre-compressor section 21 functions as a reverse Carnot cycle engine in which three operations or changes occur: (1) the change from $d$ to $e$—pressure drop, (2) the isothermal change from $e$ to $a$—heat absorbed, and (3) the adiabatic change from $a$ to $h$—pressure rise. Another isothermal change is required to maintain the operation of the system and is accomplished by the external power supplied by motor 12 for driving primary compressor 11. The amount of external energy required to maintain the system is relatively small in that it must only be sufficient to overcome such operating losses as friction which occur in the system. The vaporized refrigerant is raised to a pressure-enthalpy value such as indicated at $b$ by the primary compressor 11. Due to the heat absorbed by the refrigerant during expansion plus the heat supplied to the refrigerant during compression by the pre-compressor section 21 and the primary compressor 11, the temperature of the compressed vaporized refrigerant is higher than the ambient temperature and therefore this excess heat is expelled to the surroundings, upon the refrigerant passing through the condenser 13. Upon passing through condenser 13, an isothermal change occurs, indicated on the diagram from $b$ to $d$, whereupon the refrigerant returns to its liquid state thus completing the refrigerating cycle.

A second form of refrigerating system 31, shown in Fig. 2, is commonly referred to as a simple absorption cycle refrigerating system, and includes many of the elements found in system 10, hereinbefore described. In the second system 31, a refrigerant, such as ammonia, is employed which has a characteristic of being very soluble in water. A high pressure steam-generator 32 in conjunction with a low pressure absorber 33 is used in place of the primary compressor 11 and the pre-compressor section 21 included in system 10. The work energy obtained from the refrigerant in turbine section 20 of apparatus 18' in this instance, is utilized to drive an electrical generator 34. The electrical energy produced by the generator 34 is passed through a resistance heater 35, the latter being disposed within a housing 36 for the high pressure generator 32, and is there converted into heat, which, in conjunction with the heat generated within the housing 36 by some other external source, effects the production of substantially pure ammonia gas. By reason of the resistance heater 35 and the electrical current, obtained by the transformation of the low quality heat energy, passed therethrough, the amount of additional heat required to effect the production of the substantially pure ammonia gas is at a minimum. Apparatus 18' and 18 are substantially the same, except electrical generator 34 has been substituted for the pre-compressor section 21 of apparatus 18. The refrigerant upon leaving high pressure generator 32 is vaporized and under pressure and is passed in such a state to the condenser 13, which is similar to the condenser for system 10, at which point it is converted into a liquid state. From the condenser it passes through apparatus 18' where it is once again reconverted into a gaseous state, in a manner as described for system 10. Subsequent to passing through apparatus 18', the vaporized refrigerant is introduced through pipe 40 into low pressure absorber 33, where the refrigerant gas, i. e. the ammonia, is absorbed in a weak ammonia-water solution, thereby producing a strong aqueous ammonia solution. It will be noted, in Fig. 2, that the high pressure generator 32 and the low pressure absorber 33 are interconnected through a conduit 41 which is provided with a pressure reducing valve 42. Through the conduit 41 passes the weak ammonia-water solution, which is formed from the strong ammonia solution which exists in the high pressure generator 32 after a substantial amount of ammonia has been removed therefrom in the form of gas, $NH_3$, in the manner heretofore described. After the vaporized ammonia gas has combined with the weak ammonia-water solution in the absorber 33 to produce a strong solution the latter is caused to flow by means of an auxiliary pump 44 through conduit 45 to the high pressure generator 32. The pump 44 is actuated by some external source such as a motor or engine 46.

One form of apparatus 18 wherein the heat absorbed by the refrigerant from the heat transfer medium is converted into useful work energy is shown in Figs. 4 through 6. The apparatus 18 in this instance comprises a turbine section 20 and a precompressor section 21, both of which are hermetically sealed within a single housing 19. The housing is shown as formed of upper and lower sections 19a and 19b respectively, which are secured to one another by securing bolt and nut assemblies 62. While the housing 19 is shown provided with upper and lower sections, it is to be understood, of course, that the housing may have in place thereof side sections, not shown, which are formed by a vertical cutting plane.

Rotatably mounted within housing 19 is a turbine wheel 47 having the outer periphery thereof serrated to provide a plurality of jagged teeth 48 against which the compressed refrigerant is directed upon being introduced into the interior of the housing. The refrigerant, under pressure and in a liquid state, is introduced into the interior of the housing through a port 50, as seen more clearly in Fig. 4, whereupon the refrigerant expands and is converted substantially into a gaseous state. The interior surface of the housing 19, adjacent the periphery of wheel 47, is provided with a plurality of pockets or recesses 51 which are separated from one another by protuberances 42. No pockets, however, are formed in the interior surface of housing 19 between the inlet and outlet ports 50 and 55, respectively; thus a seal against leakage of the expanded refrigerant from outlet port 55 to inlet port 50 is provided. The ends of the protuberances 42 are substantially the same radial distance from the axis of rotation of the wheel 47 as the ends of the teeth 48; thus, as the wheel 47 rotates in a direction A, as shown in Fig. 4, by reason of the compressed refrigerant striking the jagged teeth 48, a tortuous passage 52 is formed between the interior surface of the housing 19 and the outer periphery of the wheel 47, as seen in Fig. 6. It will be noted however that this tortuous passage occurs only when the wheel 47 is in one position of rotational adjustment with respect to the housing 19. Thus as the wheel rotates the passage alternately opens and closes. When the wheel is in the position as shown in Fig. 4, no passage is provided and therefore the refrigerant in the state of expanding becomes trapped in the various pockets 51 and while so trapped undergoes further expansion by reason of the heat it absorbs from the circulating brine through the partition 54. Thus by reason of this further expansion, a greater force is exerted on the wheel 47, which results in greater velocity being imparted to such wheel.

As seen in Fig. 4, the housing 19 is provided with an outer circular passage 53 through which the brine or other heat transfer medium circulates. The partition 54 of the housing 19 intermediate the passage 53 and tortuous passage 52 is constructed of material having a high heat conductivity and thereby resulting in heat more readily passing from the brine to the refrigerant. Upon the refrigerant having passed substantially about the entire circumference of wheel 47 through tortuous passage 52 it has picked up sufficient heat from the brine that it leaves the housing 19 through an outlet port 55 in a gaseous or substantially gaseous state. The port 55, as seen in Fig. 1, communicates with a conduit 22 which in turn communicates with the input side of the pre-compressor section 21 of apparatus 18. In system 31, shown in Fig. 2, port 55 communicates with the conduit 40 which in turn communicates with absorber 33. If, however, the refrigerant upon leaving section 20 has not completely expanded, it may be advisable to pass it through an auxiliary evaporator 23 where it will pick up additional heat and effect total expansion of the refrigerant before its being introduced into the pre-compressor section 21 or absorber 33.

The passage 53 through which the brine circulates communicates at either end with ports 56 and 57 which, in turn, communicate with the conduit 27. In order to insure that only the heat contained in the circulating brine is absorbed by the refrigerant when passing through the tortuous passage 52, the housing 19 is jacketed by heat insulating material 58, as seen in Fig. 5.

The wheel 47 is keyed to a shaft 60, which is supported at either end, only one end being shown, by a roller bearing 61 disposed within the housing 19. Keyed to shaft 60 and in axially spaced relation with respect to wheel 47 is a rotor, not shown, for the pre-compressor section 21. The pre-compressor section 21 in this instance is simply a conventional type of rotary compressor. In the case of the absorption cycle system 31 shown in Fig. 2, the shaft 60 is keyed to the armature, not shown, for electrical generator 34. To prevent any flow of lubricating oil from the turbine section 20 into the pre-compressor section 21 or electrical generator 34, a series of sealing rings 62 are provided which encompass the shaft 60, as seen in Fig. 5, intermediate the sections. Only a slight amount of clearance is provided between the sides of the wheel 47 and the side portions of the housing 19. To prevent leakage of the refrigerant through this slight clearance, a film of oil is disposed therein which, when the wheel is turning, tends to move outwardly in a radial direction by reason of centrifugal force and completely fills this clearance thus preventing the expanded refrigerant from working its way towards the shaft 60.

Figure 7:
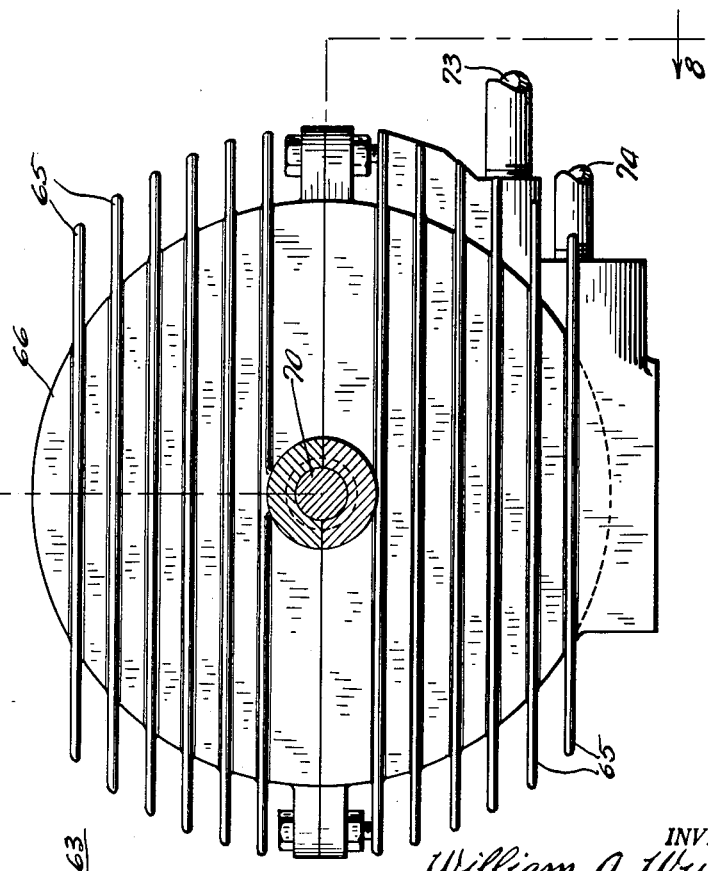
Fig. 7 is an enlarged fragmentary sectional view of a modified form of heat energy-converting apparatus taken along line 7—7 of Fig. 8.

A modified form of turbine section 63 for the apparatus 18 is shown in Figs. 7 and 8, which is adapted for use in a system wherein the heat transfer medium is air or some other similar agent. As shown in Fig. 8, the turbine section 63 is disposed within an air duct 64 in such a manner that the cooling fins 65, formed on the housing 66 for the turbine section, are disposed parallel to the direction of flow of the air through the duct; thus, reducing the friction caused by the fins to the air flow. The housing 66 is formed of material having a high heat conductivity so that the heat contained in the air as it flows through the duct 64 will be readily picked up by the fins 65 and absorbed by the refrigerant which circulates within the housing. The turbine section 63 in this instance is of a multiple stage type of turbine and comprises two turbine wheels 67 and 68 which are keyed to a common shaft 70 and are disposed in axially spaced relation with respect to one another. With this type of turbine section an equal amount of refrigerant is brought into contact with the turbine wheels 67 and 68. The turbine wheels 67 and 68 cooperate with the interior pocketed surface of the housing 66 so as to form two tortuous passages 71 and 72 respectively, through which the refrigerant during its expansion passes. The tortuous passages 71 and 72 may be arranged in either parallel relation wherein the refrigerant is introduced simultaneously into both passages, or in series relation wherein the refrigerant passes first through one of said passages and then through the other. Ports 73 and 74 communicate with tortuous passage 71 and ports 75 and 76 communicate with tortuous passage 72 so that the refrigerant may be readily introduced into and removed from each of the tortuous passages. The various other features of the section 63 are substantially the same as the turbine section 20 heretofore described.

Thus it will be seen that an improved refrigerating system has been provided which materially reduces the amount of external energy required for maintaining the operation of the system. Furthermore an apparatus has been provided which is simple and compact in construction and which effectively utilizes and converts the energy absorbed by the refrigerant during its expansion into useful work energy.

While several embodiments of this invention are shown above, it will be understood, of course, that the invention is not to be limited thereto, since many further modifications may be made, and it is contemplated, therefore, by the appended claims, to cover any such modifications as fall within the true spirit and scope of this invention.

I claim:

1. A process of utilizing the kinetic energy of a circulating liquid volatile refrigerant and the heat energy absorbed by said refrigerant from a heat transfer medium during expansion of the refrigerant to effect partial recompression of said expanded refrigerant prior to return of the latter to a primary compressor, which process comprises compressing a refrigerant to a predetermined high pressure, condensing said refrigerant, directing the flow of said condensed high pressure refrigerant into a tortuous passageway, the latter being formed intermediate the periphery of a rotary element and a casing encompassing said rotary element whereby rotation of said rotary element during expansion of said refrigerant within said passageway is effected, said casing being in thermal conductive relation with said heat transfer medium whereby said refrigerant effects heat absorption from said medium simultaneously with imparting rotation to said rotary element, and directing the flow of the expanded refrigerant to refrigerant-compressing means operatively connected to and actuated by the rotary element to effect partial recompression of said expanded refrigerant prior to final recompression of the latter to said predetermined high pressure.

2. A heat energy-converting system comprising the combination of a circulating heat transfer medium, a volatile refrigerant, a compressor for imparting a predetermined pressure to said volatile refrigerant, a condenser communicating with the discharge side of said compressor, a rotary element, a casing in thermal conductive relation with said circulating medium and encompassing said rotary element and cooperating with the periphery of the latter to form a passageway for the compressed refrigerant from said condenser wherein expansion of said refrigerant within said passageway occurs simultaneously with the absorption of heat by said refrigerant from said circulating heat transfer means, the rotation of said rotary element being dependent upon the resultant effect of the kinetic energy and the absorbed heat energy of said refrigerant during expansion of the latter, and means operatively connected to said rotary element and actuated thereby and in communication with the intake side of said compressor for imparting partial pressure to the expanded refrigerant from said passageway prior to the refrigerant returning to the intake side of said compressor.

3. A heat energy-converting system comprising the combination of a circulating heat transfer medium, a volatile refrigerant, a compressor for compressing said volatile refrigerant to a predetermined pressure, a source of power for actuating said compressor, a condenser for said refrigerant in communication with the discharge side of said compressor, a rotary element, a casing encompassing said rotary element and being provided with a first passageway, through which said heat transfer medium circulates, said first passageway being disposed in encircling relation with a second passageway formed intermediate the periphery of said rotary element and an annular thermal conductive partition formed within said casing, said partition effecting separation of said first and second passageways, said second passageway being provided for said refrigerant and communicating with said condenser wherein expansion of said refrigerant occurs within said second passageway simultaneously with absorption of heat by said refrigerant from said heat transfer medium through said thermal conductive partition prior to said refrigerant being returned to said compressor, the resultant effect of the kinetic energy and the absorbed heat energy of said compressed refrigerant during expansion thereof imparting rotary motion to said rotary element, and means operatively connected to and actuated by said rotary element and cooperating with said compressor to effect reduction of the power input from said source of power to said compressor to maintain said refrigerant at said predetermined pressure.

4. A heat energy-converting system comprising the combination of a circulating heat transfer medium, a volatile refrigerant, a first compressor actuated by an outside source of power for effecting compression of said refrigerant, a condenser in communication with the discharge side of said first compressor, a rotary element, a casing encompassing said rotary element and cooperating with the periphery thereof to form a first passageway communicating with said condenser and through which the compressed refrigerant circulates and is expanded, the resultant effect of the kinetic energy and the absorbed heat energy of said compressed refrigerant during expansion thereof imparting rotary motion to said rotary element, a second passageway for the circulating heat transfer medium formed in said casing and in substantially concentric relation with said first passageway, the portion of said casing intermediate said passageways being formed of thermal conductive material whereby heat absorption by said circulating refrigerant from said heat transfer medium occurs simultaneously with the expansion of said refrigerant within said first passageway, and a secondary compressor communicating with and intermediate said first passageway and said first compressor for effecting partial recompression of said expanded refrigerant prior to the latter returning to the intake side of said first compressor; said secondary compressor including a piston operatively connected to and actuated by said rotary element.

5. In a refrigeration system having a circulating heat transfer medium, a volatile refrigerant, a condenser, and a compressor for such refrigerant; an energy-converting apparatus, disposed intermediate the condenser and compressor, comprising a rotary element having a serrated peripheral edge, a housing encompassing said element, said housing being provided with an annular first passageway substantially encircling and being spaced from said element peripheral edge and through which the heat transfer medium circulates, the portion of said housing intermediate said first passageway and said element peripheral edge being formed of thermal conductive material, said housing portion having the surface thereof adjacent said element peripheral edge provided with a plurality of indentations which cooperate with said element peripheral edge, when said element is in one position of rotational adjustment, to form an annular tortuous second passageway for communicating with the outlet of the condenser and through which the compressed refrigerant circulates, and when said element is in a second position of rotational adjustment, cooperating with said element serrated peripheral edge to form a plurality of independent pockets for entrapping portions of the compressed refrigerant whereby the latter effects heat absorption from the heat transfer medium circulating in said first passageway, the rotation of said rotary element being dependent upon the resultant effect of the kinetic and heat absorbed energies of the compressed refrigerant when circulating in said second passageway, and auxiliary refrigerant compressing means for communicating with the intake side of the compressor and operatively connected to said rotary element and actuated by the rotation thereof to effect partial recompression of the refrigerant subsequent to the latter passing through said second passageway.

References Cited in the file of this patent

UNITED STATES PATENTS

| | | |
|---|---|---|
| 938,253 | Lawson | Oct. 26, 1909 |
| 1,204,918 | Wiemann | Nov. 14, 1916 |
| 2,100,883 | Tauer | Nov. 30, 1937 |
| 2,156,096 | Robinson | Apr. 25, 1939 |
| 2,394,109 | Sanchez | Feb. 5, 1946 |
| 2,413,796 | Sprouse | Jan. 7, 1947 |
| 2,423,183 | Forsyth | July 1, 1947 |
| 2,494,120 | Ferro, Jr. | Jan. 10, 1950 |
| 2,508,397 | Kane | May 23, 1950 |
| 2,519,010 | Zearfoss | Aug. 15, 1950 |